May 20, 1958   R. E. W. HARRISON   2,834,971
METHOD AND APPARATUS FOR MAKING PLASTIC BOATS
Filed May 12, 1954   2 Sheets-Sheet 1

INVENTOR.
ROBERT E. W. HARRISON
BY George Sipkin
B. L. Zanquill
ATTORNEYS

May 20, 1958   R. E. W. HARRISON   2,834,971
METHOD AND APPARATUS FOR MAKING PLASTIC BOATS
Filed May 12, 1954   2 Sheets-Sheet 2

INVENTOR.
ROBERT E. W. HARRISON
BY George Sipkin
B. L. Zangwill
ATTORNEYS

United States Patent Office 2,834,971
Patented May 20, 1958

2,834,971

METHOD AND APPARATUS FOR MAKING PLASTIC BOATS

Robert E. W. Harrison, Washington, D. C.

Application May 12, 1954, Serial No. 429,409

7 Claims. (Cl. 9—6)

(Granted under Title 35, U. S. Code (1952), sec. 266)

The invention described herein may be manufactured and used by or for the Government of the United States of America for governmental purposes without the payment of any royalties thereon or therefor.

The present invention relates to plastic boats and more particularly to an improved method of manufacture and of reinforcing plastic boats both during and after construction.

The prior art discloses various methods of manufacturing plastic boats, one of which comprises the insertion of any one of a number of fibrous materials between the cope and drag mold sections utilized in forming the boat. A resinous or plastic material of the thermosetting or thermoplastic type is then poured through a suitable opening into the cavity formed by the mold sections until all interstices between the mold, resinous and fibrous materials have been filled. Various processes have also been employed for achieving a bond between the plastic and fibrous materials and for eliminating air pockets and void spaces in the mass. Such processes have included the application of pressure for feeding the plastic to the mold and the use of a vacuum for distributing the plastic and inducing it to properly mingle with the reinforcing fibrous material, thereby achieving a strong bonding effect between materials.

The above-described prior art process has only been used, as far as applicant is aware, in the manufacture of a complete boat involving a single casting operation. It has always been the opinion of those skilled in the art that this and similar processes have been successful in producing a homogeneous mass, but recent tests have positively disclosed that there is a starvation of plastic in some areas of the boat. Analysis of samples of reinforced plastic sections have shown that because of the lack of control over the dispositon of the glass fibers, there is an actual weakening of the boat structure rather than reinforcing it.

Furthermore, there is ample evidence that the viscosity of the semi-liquid plastic is such that the plastic fails to respond to the pressure and/or vacuum treatment with the result that the fibers are not properly wetted. The boat thereby produced is a laminated structure tending to parts on the neutral axis between tension and compression sides. The above-cited disadvantages of the prior art are attributed to the lack of control over the plastic and fibrous materials during the casting process because of the excessively large void area in the molds that must be filled with material.

The present invention overcomes the foregoing disadvantages by providing a boat of simple design which is made in symmetrical halves. The halves are ultimately bolted together at the keel, the joint made watertight by the use of a plastic glue, and the keel additionally reinforced by the insertion of a shaped metal bar inserted in pre-cast recesses in the keel structure. The reinforcing bar insures correct alignment of the two halves of the boat and provides the necessary longitudinal strength for withstanding rugged handling methods and adverse weather conditions encountered by the boat when in service.

An object of the invention is the provision of an improved method for manufacturing a boat which will readily lend itself to mass production techniques.

Another object of the invention is to provide, by the principle of reinforcement, a stronger boat having thinner walls and of less weight than those of the prior art.

A further object of the invention is provision of a boat made in symmetrical halves and having the halved sections glued together to form a watertight fit.

A final object of the invention is to provide a plastic boat having both integrally cast and exteriorly formed reinforcing means for strengthening the longitudinal and athwartship sections of the boat.

With these and other objects in view, as will hereinafter more fully appear, and which will be more particularly pointed out in the appended claims, reference is now made to the following description taken in conjunction with the accompanying drawings in which:

Figure 1:
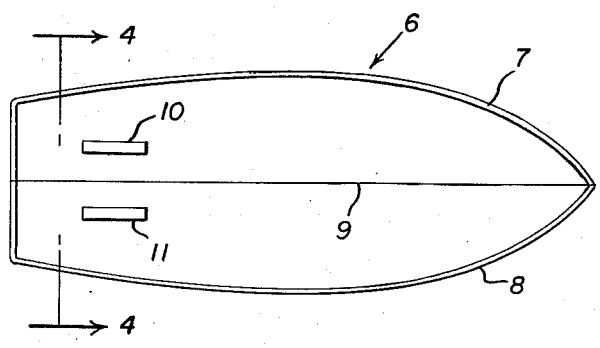
Figure 1 is a plan view of the plastic boat comprising the invention.
Figure 2:
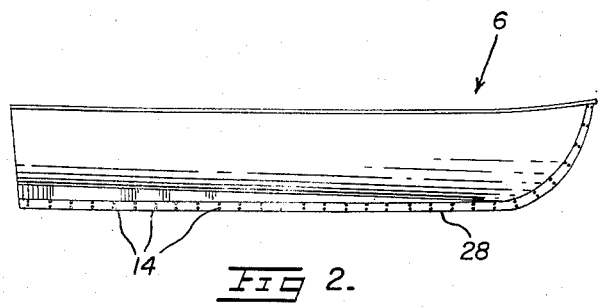
Figure 2 is a side view of the plastic boat of Figure 1 showing the position of strengthening bolts along the length of the keel.

Referring now to the drawings, wherein like reference characters designate like or corresponding parts throughout the several views, there is shown a plastic boat 6 comprising a pair of symmetrical halves 7 and 8 joined along the centerline 9 for forming the shell of the boat. Block members 10 and 11 are integrally cast with their respective boat halves for providing bed plates for an engine adapted for mounting inboard of the shell. A plurality of bolts 14 extend transversely through the keel for firmly securing the boat halves to one another, as more fully described hereinafter.

Figure 3:
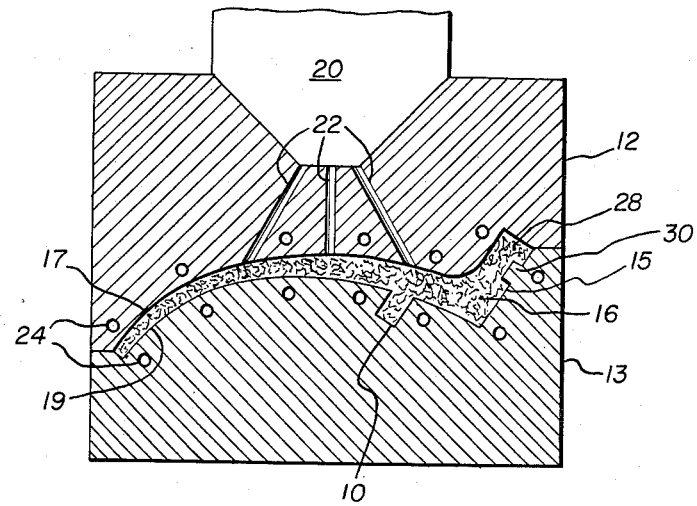
Figure 3 is a cross-sectional view in elevation of the cope and drag mold sections just prior to adding the resinous materials.
Figure 4:
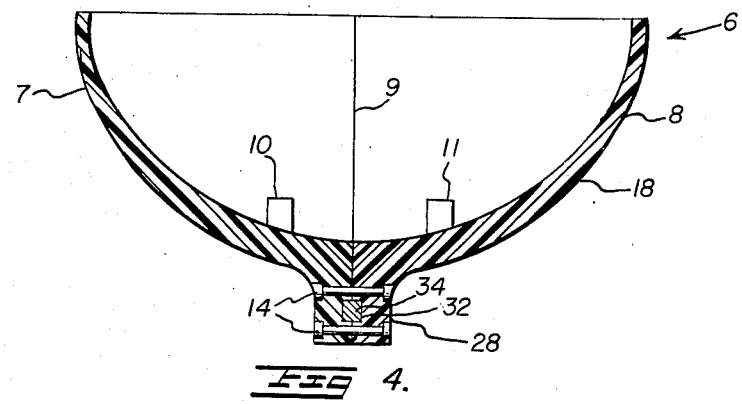
Figure 4 is a cross-sectional view taken on lines 4—4 of Figure 1.

Referring now to Figures 3 and 4, there is shown a pair of mating cope and drag mold sections 12 and 13 placed in an operating position. A void section 15, here-, in shown as containing short glass fibers 16, is formed by coacting curved surfaces 17 and 19 respectively, of the cope and drag mold sections. As shown in Figure 3, the surfaces 17 and 19 forming void 15 provide an area, which when filled with fibrous and resinous materials, produces a one-half shell for the boat.

The cope 12 is provided with a hopper 20 formed in the upper end thereof and bored openings or pipes 22 interconnect the hopper with void 15 for supplying casting materials thereto. Each of the molds 12 and 13 contain an integrally formed continuous passageway 24 for conducting a heating fluid through the molds to regulate the curing of the casting; and in the alternative, pipes may be embedded in the molds for serving this purpose, or electric current may be used in lieu of a heating fluid.

As illustrated in Figure 3, the cope and drag coact with one another in such manner as to form a keel 28 on one end of the shell casting. Since the complete half shell is made in one pouring operation, the keel is integrally cast and extends the length of the casting. The drag section 13 is provided with a recess for forming one of the engine bed plates 10, and is further provided with a protruding member 30 which ultimately shapes a rectangular opening 32 also extending the length of the casting. It will be clear, in considering Figures 3 and 4 of the drawings, that when the half shells 7 and 8 are mated with one another, the keel 28 for the boat is formed, and within the keel is provided the aforementioned rectangular opening, both of which extend the length of the boat. The purpose of the rectangular opening 32 is to constitute a void area for receiving a bar 34, preferably of square section, although other designs may be used, which serves to reinforce the keel and provide longitudinal strength to the boat.

In operation, the glass fibers 16 are positioned on the drag 13, and cope 12 is placed thereon in an operating position. The mold is then preheated by conducting a heating fluid or electrical current through the cope and drag sections prior to pouring the resinous material. The plastic or resinous material 18 may comprise any one of the thermosetting or thermoplastic types having a low viscosity and being capable of thoroughly wetting the glass fibers 16. The resinous material is fed from the hopper by gravity into void 14, or a pressure and/or vacuum process may be employed for facilitating the flow of the plastic in a manner well known in the art. After the plastic pouring process is completed, the casting is cured by slowly decreasing the temperature of the circulating fluid and the mold, as is also well known in the prior art.

The molds are then broken open and the casting removed. The other half shell for the boat can also be made by using molds of opposite contour. The boat is then formed by placing the two symmetrical half sections 7 and 8 adjacent one another, the adjacent sides of each section being coated with glue for achieving a watertight fit. Reinforcing bar 34 is placed in recess 32, and bolts 14 are then inserted in the transverse openings extending along the length of the keel thereby completing the assembly of the boat.

Figure 5:
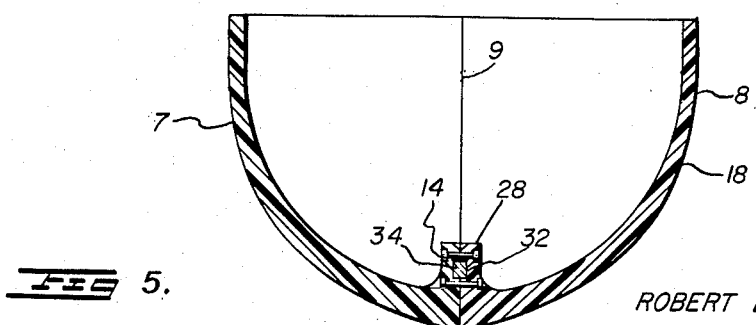
Figure 5 is a cross-sectional view in elevation showing a keel reinforcing member positioned within the confines of the shell of a boat.

The modification of Figure 5 is made by following the process described above, the difference in structure, however, residing in locating keel 28 inside the boat hull or shell. In order to achieve an interiorly disposed keel, it is only necessary to provide cope and drag mold sections with an end turned in reverse from that shown in Figure 3. The casting made from such a mold can be readily joined with one identical in shape for producing a boat having a smooth bottom as shown in Figure 5. The main advantage derived from this type boat is that since it has less draft, it can be operated in shallow water without running aground. The strength of the boat and the process followed in making and assembling the parts however are the same as that described in relation to Figure 4.

If desired, additional engine bed plates or seats, for example, may be provided by the simple expedient of forming recesses in the drag section of the mold so that the casting will contain these features.

The advantages accruing from the apparatus and method disclosed in manufacturing the plastic boat of this invention is that the complete operation is speeded up and is under more positive control of the operator. A half of boat is produced by the casting operation; therefore, closer control is exercised over the plastic and reinforcing materials, the molds are cheaper to produce and maintain, and inspection for quality is facilitated. The reinforced keel is a highly desirable design feature, and the boat is reinforced according to a preconceived plan.

It should be understood that the foregoing disclosure relates only to the preferred embodiments of the invention and that numerous modifications or alterations may be made therein without departing from the spirit and scope of the invention as set forth in the following claims.

What is claimed is:

1. A plastic boat comprising a pair of symmetrical cast members which, when joined together along the keel line, form the shell of said boat, each of said symmetrical members comprising a combination of cast resinous and reinforcing materials, said members each having a keel portion integrally cast on the bottom thereof, an open- faced recess in said keel portion of each member adapted to mate with one another to thereby form a closed recess of predetermined contour when said symmetrical members are placed in position to form the shell of said boat, a rigid reinforcing member of substantially the same contour as that of the closed recess positioned in said closed recess along the length thereof for strengthening said keel, said reinforcing member being surrounded and waterproofed by the resinous material of the boat and fastening means rigidly affixing said members to one another along said keel portions thereby providing a watertight fit for said boat.

2. The combination according to claim 1 wherein said keel portions integrally cast on the bottom of said members are turned outwardly thereby providing a keel exterior to said shell when said members are placed in a shell-forming position.

3. The combination according to claim 1 wherein said keel portions integrally cast on the bottom of said members are turned inwardly with the bottom exterior surface of each of the members being formed as a substantially single smooth curve thereby forming a keel inside of said shell and a smooth bottom shell when said members are placed in a shell-forming position.

4. A plastic boat comprising a pair of symmetrical castings fastened together along the keel line of said boat, a keel of plastic material formed on the bottom of said castings, said keel comprising a protruding member integrally cast on each of said castings, a closed recess of predetermined contour in said keel extending the length of said boat, a metal reinforcing member in said recess, said reinforcing member being of substantially the same contour as that of the closed recess and being surrounded by the plastic material of the keel and a plurality of bolts extending transversely through said protruding members for securing said symmetrical castings together and forming a watertight fit therebetween.

5. A plastic boat comprising a pair of reinforced plastic symmetrical parts adapted to be joined at their bottom for forming the shell of said boat, said symmetrical parts comprising a first member and a second member, each of said members comprising an integrally cast plastic keel portion on the bottom thereof and having a closed recess in said keel portion, fastening means extending transversely through said keel portion of said first and second members whereby said keel portions are drawn in contact with one another for forming the keel and shell of said boat, and a metal reinforcing bar in the recess formed by said keel portions for strengthening the keel of said boat, said reinforcing bar being of substantially the same contour as the closed recess and being surrounded and waterproofed by the plastic keel.

6. The method of making a boat which comprises molding a pair of symmetrical half shells of fibrous and resinous materials, providing an open-faced recess extending longitudinally of and near the bottom of each of said half shells, placing a reinforcing bar in a closed recess formed when said symmetrical half shells are placed in contact with one another, and bolting said shells together along the keel line for rigidly securing said shells together and thereby incasing the reinforcing bar within the closed recess.

7. The method of making a boat which comprises molding a pair of symmetrical half shells of fibrous and resinous materials, forming an integral keel portion on the outer side of each of said half shells, providing a longitudinal open-faced recess in said keel portion of each of said shells so that, when said symmetrical halves are assembled, the recess in each keel portion mates with the other for forming a closed passageway of predetermined contour extending the length of the boat, placing a rigid reinforcing bar of substantially the same contour as that of the closed passageway in said passageway, assembling said shells and reinforcing bar in position for forming said boat, and inserting a plurality of bolts transversely through said keel portions for securing said shells together with the reinforcing bar surrounded and waterproofed by the fibrous and resinous materials of the shells.

References Cited in the file of this patent

UNITED STATES PATENTS

| | | |
|---|---|---|
| 655,994 | Riess | Aug. 14, 1900 |
| 1,618,409 | Dykes | Feb. 22, 1927 |
| 1,667,561 | Mediavilla | Apr. 24, 1928 |
| 2,381,631 | Waring | Aug. 7, 1945 |
| 2,721,341 | Roberts et al. | Oct. 25, 1955 |

FOREIGN PATENTS

| | | |
|---|---|---|
| 955,794 | France | Jan. 18, 1950 |